(12) United States Patent
Nerkar et al.

(10) Patent No.: US 12,655,540 B2
(45) Date of Patent: Jun. 16, 2026

(54) 3D PRINTING WITH ENHANCED INTERLAYER ADHESION

(71) Applicant: Rohm and Haas Company, Collegeville, PA (US)

(72) Inventors: Manoj Nerkar, Royersford, PA (US); Richard J. Ketz, Norristown, PA (US); Ian J. Drake, Conshohocken, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 290 days.

(21) Appl. No.: 18/266,390

(22) PCT Filed: Dec. 2, 2021

(86) PCT No.: PCT/US2021/061511
§ 371 (c)(1),
(2) Date: Jun. 9, 2023

(87) PCT Pub. No.: WO2022/132441
PCT Pub. Date: Jun. 23, 2022

(65) Prior Publication Data
US 2024/0044050 A1 Feb. 8, 2024

Related U.S. Application Data

(60) Provisional application No. 63/124,928, filed on Dec. 14, 2020.

(51) Int. Cl.
| | |
|---|---|
| *D01F 1/10* | (2006.01) |
| *B33Y 70/10* | (2020.01) |
| *B33Y 80/00* | (2015.01) |
| *C08L 27/06* | (2006.01) |
| *C09D 11/102* | (2014.01) |
| *D01F 6/10* | (2006.01) |

(52) U.S. Cl.
CPC ................ *D01F 1/10* (2013.01); *B33Y 70/10* (2020.01); *B33Y 80/00* (2014.12); *C08L 27/06* (2013.01); *C09D 11/102* (2013.01); *D01F 6/10* (2013.01); *C08L 2205/03* (2013.01); *D10B 2505/00* (2013.01)

(58) Field of Classification Search
CPC .. D01F 1/10; D01F 6/10; B33Y 80/00; B33Y 70/10; C08L 27/06; C08L 2205/03; C09D 11/102; D10B 2505/00
See application file for complete search history.

(56) References Cited

U.S. PATENT DOCUMENTS

| | | | |
|---|---|---|---|
| 2009/0076191 A1* | 3/2009 | Aoyama ................. C08L 67/04 523/124 |
| 2011/0136980 A1 | 6/2011 | Pirra et al. |
| 2020/0325323 A1 | 10/2020 | Liu et al. |
| 2021/0147626 A1 | 5/2021 | Jeol et al. |
| 2021/0163735 A1* | 6/2021 | Jin .......................... C08L 67/02 |
| 2021/0339463 A1* | 11/2021 | Hikmet ................. B29C 64/336 |

FOREIGN PATENT DOCUMENTS

| | | | | |
|---|---|---|---|---|
| CN | 108342050 A | * | 7/2018 | .............. C08L 33/12 |
| EP | 3738748 A1 | * | 11/2020 | ........... B29C 64/209 |
| JP | 2016060048 A | | 4/2016 | |
| JP | 2016169456 A | | 9/2016 | |
| WO | 2018106464 | | 6/2018 | |

OTHER PUBLICATIONS

Kaneka Kane Ace M732 data sheet (Year: 2025).*
English translation of CN 108342050 A to Feng obtained from PE2E database (Year: 2018).*

* cited by examiner

*Primary Examiner* — Jeremy R Pierce
(74) *Attorney, Agent, or Firm* — Warner Norcross + Judd LLP

(57) ABSTRACT

A filament for three-dimensional printing comprises a thermoplastic resin and an acrylic polymer additive in an amount ranging from 0.1 to 20 parts per hundred of the thermoplastic resin (phr). A 3D printed article prepared from the filament and a process for preparing filament for three-dimensional printing are also disclosed.

18 Claims, No Drawings

3D PRINTING WITH ENHANCED INTERLAYER ADHESION

FIELD OF THE INVENTION

The present invention generally relates to a 3D printing and, more specifically, to a 3D filaments having enhanced interlayer adhesion.

DESCRIPTION OF THE RELATED ART

Three-dimensional (3D) printing has become a powerful tool for rapidly creating three-dimensional objects. From rapid prototyping parts in industry to hobbyists creating 3D designs at home, 3D printing is a useful and flexible tool for creating complex objects. 3D printing is also being used to produce parts for functional use. These parts may have complex shapes or require the high precision that 3D printing can provide.

One common form of 3D printing is fused deposition modeling, in which polymer filaments are fed through a heated nozzle to heat the filament and extrude the polymer so that it can be additively deposited on previously formed layers so as to form a 3D object.

One of the issues with current 3D printing technology is low interlayer adhesion. Because of the additive nature of 3D printing, it is important for material to adhere well to previously deposited material. Interlayer adhesion is driven by polymer fusion.

For typical thermoplastics, polymer fusion is driven by temperature and shear during melt processing. Higher shear typically provides faster fusion.

In the 3D printing process, shear is a negligible factor. The lack of shear can lead to poor adhesion between layers of deposited material. Poor adhesion can then lead to structural failure of the 3D printed object. Poor interlayer adhesion may also lead to shrinkage and warpage due to failure of the material to adhere properly within the 3D object.

Therefore, it is desirable to provide 3D printing filament that has improved interlayer adhesion.

BRIEF SUMMARY OF THE INVENTION

The present invention provides a filament for three-dimensional printing comprising a thermoplastic resin and an acrylic polymer additive in an amount ranging from 0.1 to 20 parts per hundred of the thermoplastic resin (phr).

A 3D printed article prepared from the filament is also disclosed.

The present invention further relates to a process for preparing filament for three-dimensional printing comprising combining a thermoplastic resin and an acrylic polymer additive to form a blend, wherein the acrylic polymer additive is present in an amount ranging from 0.1 to 20 phr, and extruding the blend in the form of a filament.

DETAILED DESCRIPTION OF THE INVENTION

The present invention provides a filament for 3D printing, such as, for example, fused deposition modeling (FDM). The filament has excellent strength and interlayer adhesion, as described below. A process of preparing filament for 3D printing is also provided and described below.

The filament comprises a thermoplastic resin and an acrylic polymer additive.

Examples of thermoplastic resins that may be used in accordance with the present invention include, but are not limited to, polylactic acid (PLA), polyvinyl chloride (PVC), acrylonitrile butadiene styrene (ABS), polymethyl methacrylate (PMMA), polycarbonate (PC), polyethylene terephthalate (PET), polyethylene trimethylene terephthalate (PETT), polybutylene terephthalate (PBT), polyamide (nylon), polyvinyl alcohol (PVA), polystyrene (PS), high impact polystyrene (HIPS), and blends thereof. For example, the thermoplastic resin may comprise a blend of thermoplastic resins, such as a blend of polycarbonate with ABS, PET or PBT. Preferably, the thermoplastic resin is selected from PLA or PVC. More preferably, the thermoplastic resin is PVC.

The acrylic polymer additive may comprise an acrylic homopolymer or copolymer. For example, the acrylic copolymer may be the reaction product of one or more monomers selected from alkyl (meth)acrylate monomers. Examples of alkyl (meth)acrylate monomers include, but are not limited to alkyl (meth)acrylates comprising linear or branched alkyl groups with 1 to 12 carbon atoms, such as methyl (meth)acrylate, ethyl (meth)acrylate, propyl (meth)acrylate, butyl (meth)acrylate, ethyl hexyl acrylate, and iso-octyl acrylate. Preferably, the alkyl (meth)acrylate monomers comprise monomers selected from methyl (meth)acrylate, ethyl (meth)acrylate, and butyl (meth)acrylate monomers.

Preferably, the acrylic polymer additive comprises at least 25 wt. % of units derived from methyl methacrylate monomers based on the total weight of the acrylic polymer additive. More preferably, the acrylic polymer additive comprises at least 30 wt %, even more preferably, at least 35 wt %, and still more preferably at least 40 wt. % of units derived from methyl methacrylate monomers based on the total weight of the acrylic polymer additive. For example, the acrylic polymer additive may comprise at least 50 wt. %, at least 60 wt. %, at least 70 wt. % or at least 80 wt. % of units derived from methyl methacrylate monomers based on the total weight of the acrylic polymer additive.

Exemplary acrylic polymer additives include, but are not limited to, copolymers of methyl methacrylate and at least one additional monomer selected from ethyl acrylate, butyl acrylate, and butyl methacrylate. For example, the acrylic polymer additive may comprise terpolymer, such as a terpolymer of methyl methacrylate, ethyl acrylate, and butyl methacrylate or a terpolymer of methyl methacrylate, butyl acrylate, and butyl methacrylate.

The acrylic polymer additive may further comprise units derived from additional monomers, such as, for example, styrenic monomers or a functional monomers. As used herein, a "functional monomer" is a monomer that comprises an additional functional group, such as a functional group that would allow the acrylic copolymer to form a covalent or hydrogen bond to the thermoplastic resin or other components in the composition. An example of functional monomers include monomers having a hydroxyl group.

The acrylic polymer additive may comprise the reaction product of monomers selected from methyl methacrylate monomers, butyl acrylate monomers, styrenic monomers, and combinations thereof. For example, the acrylic polymer additive may be the reaction product of a combination of methyl methacrylate monomers and butyl acrylate monomers or from a combination of methyl methacrylate monomers, butyl acrylate monomers, and styrenic monomers.

The acrylic polymer additive may be a linear or branched polymer. Alternatively, the acrylic polymer additive may comprise a crosslinked component where the crosslinked component comprises either part or all of the acrylic polymer additive. For example, the acrylic polymer additive may comprise a core-shell acrylic additive having a crosslinked core and a shell comprising an acrylic homopolymer or copolymer.

The crosslinked core may be the reaction product of one or more monomers selected from the group consisting of alkyl (meth)acrylates with one or more crosslinking monomers, graft-linking monomers or combinations thereof. For example, the amount of units derived from alkyl (meth) acrylate monomers may range of 95 to 99.9 wt. % of the core and the amount of units derived from the cross-linking monomer and/or graft linking monomers may range from 0.1 to 5 wt. %.

The shell of the core-shell acrylic additive may comprise one or more layers which may, for example, comprise units derived from one or more monomers selected from the group consisting of alkyl (meth)acrylate, styrenic monomers, and combinations thereof. The one or more layers of the shell may also comprise units derived from one or more chain transfer agents.

For example, the shell of the core-shell acrylic additive may comprise one or more layers each of which comprises from 98.5 to 100 wt. % units derived from one or more monomers selected from the group consisting of alkyl (meth)acrylate, styrenic monomers, and combinations of two or more thereof, and from 0 to 1.5 wt. % units derived from one or more chain transfer agents.

The alkyl of the alkyl (meth)acrylate used in the crosslinked core or shell may be a linear or branched alkyl group with 1 to 12 carbon atoms. Exemplary monomers include butyl acrylate, ethyl hexyl acrylate, ethyl acrylate, methyl methacrylate, butyl methacrylate, and iso-octylacrylate.

Examples of cross-linking and/or graft-linking monomers useful in the crosslinked core or shell of the core-shell acrylic additive may include, for example, butanediol diacrylate, butanediol dimethacrylate, ethylene glycol diacrylate, ethylene glycol dimethacrylate, divinyl benzene, diethylene glycol diacrylate, diethylene glycol dimethacrylate, diallyl maleate, allyl methacrylate, diallyl phthalate, triallyl phthalate, trimethylolpropane triacrylate, trimethylolpropane trimethacrylate blends thereof and combinations of two or more thereof.

The core-shell acrylic additive may be produced by any conventional process such as multi-stage emulsion polymerization.

When the acrylic polymer additive is a linear or branched polymer, the acrylic polymer may have a weight average molecular weight of at least 1,000,000 g/mol, such as, for example, a weight average molecular weight of at least 1,250,000 g/mol or at least 1,500,000 g/mol. Preferably, the acrylic copolymer has a weight average molecular weight of less than 7,500,000 g/mol, such as, for example, less than 6,000,000 g/mol, or less than 5,000,000 g/mol. When the acrylic polymer additive comprises a crosslinked component, the weight average molecular weight may be lower, such as, for example, less than 1,000,000 g/mol or less than 750,000 g/mol.

The acrylic polymer additive is present in the filament in an amount ranging from 0.1 to 20 parts per hundred of the thermoplastic resin, i.e., 0.1 to 20 parts by weight of the acrylic polymer additive per 100 parts by weight of the thermoplastic resin. Preferably, the acrylic polymer additive is present in an amount of at least 0.25 phr, such as, for example, at least 0.5 phr or 1 phr. Preferably, the acrylic polymer additive is present in an amount less than 15 phr or less than 10 phr.

The filament may have a diameter suitable for 3D printing. For example, common filament sizes for 3D printing include 1.75 mm and 2.85 mm. Other sizes may also be used.

Generally speaking, the acrylic polymer additive may allow various advantages to be realized. When the filament is used in a 3D printing process, the acrylic polymer additive may improve the interlayer adhesion of the printed article. The acrylic polymer additive may also provide additional advantages, such as, improved shrinkage and warpage.

The composition may further comprise additional components, such as, for example, stabilizers, antioxidants, lubricants, impact modifiers, plasticizers, ultraviolet agents, flame retardants, colorants (e.g., pigments, dyes) or fillers. For example, the filament may further comprise a filler selected from carbon fiber, natural fibers (e.g., wood fiber, bamboo fibers, cellulose), mineral fillers (e.g., calcium carbonate, mica), metal powders, and graphite. These fillers may impart additional properties to the filament and/or the printed article. For example, carbon fibers may impart additional strength and metal powders and/or graphite may be used to make the material conductive. These components are known in the art and can be used according to conventional practice.

A process for preparing filament for 3D printing is also provided. The method comprises combining a thermoplastic resin and an acrylic polymer additive to form a blend and extruding the blend in the form of a filament.

The step of combining the thermoplastic resin and an acrylic polymer additive may further comprise combining additional components with the thermoplastic resin and the acrylic polymer additive, such as, for example, a colorant/dye, filler, or other component (e.g., stabilizers, antioxidants, lubricants, impact modifiers, plasticizers, ultraviolet agents, flame retardants).

The components of the composition may be combined in any order and via any suitable manner. For example, the thermoplastic polymer additive and the acrylic polymer additive may be blended as dry components and then extruded to form the filament. Alternatively, the acrylic polymer additive may be added as a powder to a melted thermoplastic resin.

The blended composition for preparing the filament may be formed under mixing, heat or shear, e.g. with suitable mixing equipment. For example, the composition may be formed in a vessel equipped with an agitator and/or mixing blades, or a lab two roll mill. The vessel may be, for example, an internal mixer, such as a Banbury, Sigma (Z) Blade, or Cavity Transfer style mixer. Alternatively or in addition, the composition may be formed in or processed by an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the composition. The blended composition may then be extruded through an appropriately shaped die to form the filament described herein. The process may also comprise cooling the filament after it has been extruded.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

EXAMPLES

In the Examples, compositions were prepared by blending a PVC resin (FORMOLON® 614 available from Formosa Plastics) with varying levels of two different acrylic polymer additives. Examples 1 and 2 were prepared by blending 2 and 4 phr, respectively, of a first acrylic polymer additive (APA1) comprising a terpolymer of methyl methacrylate, ethyl acrylate, and butyl methacrylate having a weight average molecular weight greater than 1,250,000 g/mol. The first acrylic polymer additive (APA1) comprised about 80 wt % methyl methacrylate. Examples 3 and 4 were prepared by blending 2 and 4 phr, respectively, of a second acrylic polymer additive (APA2) comprising a terpolymer of methyl methacrylate, butyl acrylate, and butyl methacrylate, where the methyl methacrylate is the major component at about 85 wt %, and having a weight average molecular weight greater than 1,500,000 g/mol. The compositions of the examples are shown below in Table 1, where all amounts are shown in parts by weight relative to 100 parts of the PVC resin. A similar composition without an acrylic polymer additive was prepared as Comparative Example 1.

TABLE 1

|  | Ex. 1 | Ex. 2 | Ex. 3 | Ex. 4 | Comp. Ex. 1 |
|---|---|---|---|---|---|
| PVC | 100 | 100 | 100 | 100 | 100 |
| TM 181 | 2 | 2 | 2 | 2 | 2 |
| 629A PE Wax | 0.2 | 0.2 | 0.2 | 0.2 | 0.2 |
| Calcium Stearate | 0.8 | 0.8 | 0.8 | 0.8 | 0.8 |
| XL 165 | 0.8 | 0.8 | 0.8 | 0.8 | 0.8 |
| B3310 | 0.5 | 0.5 | 0.5 | 0.5 | 0.5 |
| $TiO_2$ | 5 | 5 | 5 | 5 | 5 |
| $CaCO_3$ | 4 | 4 | 4 | 4 | 4 |
| K175 | 1 | 1 | 1 | 1 | 1 |
| APA1 | 2 | 4 | 0 | 0 | 0 |
| APA2 | 0 | 0 | 2 | 4 | 0 |
| Total | 116.3 | 116.3 | 116.3 | 116.3 | 116.3 |

The exemplary polyvinyl chloride formulations were prepared by adding the materials shown in Formulation Table 1 sequentially. The dry blends were prepared by adding the PVC powder at room temperature to a Gunther Papenmeier/Welex blender, ramping the power to 15 A, adding the stabilizer, TM 181 at 125° F., adding the lubricant package at 150° F., adding the acrylic processing aids at 170° F., adding $TiO_2$ at 190° F., $CaCO_3$ at 195° F. Finally powder dry blends were cooled to room temperature.

To test the interlayer adhesion of the compositions, each of the compositions was extruded to form a spiral coil using a die of 4.763 mm diameter. To form the spiral coil, extrudates (i.e., filaments) were rolled over 1.5 inch diameter rod. Interlayer adhesion was measured using a Tinius Olsen universal testing machine. Two ends of spiral coils were locked in two grips of universal testing machine and then pulled biaxially until separation of layers of spiral coil or breakage of sample. Samples with acrylic polymer additive did not separate but instead broke while samples with no acrylic polymer additives failed due to separation of layers. Load required to separate the layer and break the samples is shown in Table 2. As shown in Table 2, the examples according to the present invention had substantially improved interlayer adhesion compared to Comparative Example 1.

TABLE 2

| Sample | Yield Load (lbf) |
|---|---|
| Ex. 1 | 33.6 |
| Ex. 2 | 43.6 |
| Ex. 3 | 27.0 |
| Ex. 4 | 40.9 |
| Comp. Ex. 1 | 9.3 |

Definitions and Usage of Terms

Unless otherwise indicated by the context of the specification, all amounts, ratios and percentages are by weight, and all test methods are current as of the filing date of this disclosure. The articles "a", "an" and "the" each refer to one or more. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The term "composition," as used herein, includes material (s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term copolymer (employed to refer to polymers prepared from more than one type of polymer). Trace amounts of impurities may be incorporated into and/or within the polymer.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

What is claimed is:

1. A filament for three-dimensional printing comprising:
a thermoplastic resin; and
an acrylic polymer additive in an amount ranging from 0.1 to 20 parts per hundred of the thermoplastic resin (phr);
wherein the thermoplastic resin is selected from the group consisting of polylactic acid (PLA), polyvinyl chloride (PVC), acrylonitrile butadiene styrene (ABS), polymethyl methacrylate (PMMA), polycarbonate (PC), polyethylene terephthalate (PET), poly trimethylene terephthalate PTT, polybutylene terephthalate (PBT), polyamide (nylon), polyvinyl alcohol (PVA), polystyrene (PS), high impact polystyrene (HIPS), and blends thereof;
wherein the acrylic polymer additive comprises an acrylic copolymer that is the reaction product of methyl methacrylate monomers and at least one additional monomer selected from ethyl (meth)acrylate and butyl (meth)acrylate monomers; and
wherein the acrylic polymer additive comprises at least 45 wt. % of units derived from the methyl methacrylate based on the total weight of the acrylic polymer additive.

2. The filament of claim 1, wherein the acrylic polymer additive comprises at least 80 wt. % of units derived from the methyl methacrylate based on the total weight of the acrylic polymer additive.

3. The filament of claim 1, wherein the acrylic copolymer comprises an acrylic terpolymer that is the reaction product of methyl methacrylate monomers, butyl acrylate monomers, and at least one additional monomer selected from ethyl acrylate and butyl methacrylate monomers.

4. The filament of claim 1, wherein the acrylic polymer additive comprises a core-shell acrylic additive.

5. The filament of claim 4, wherein the core comprises the reaction product of alkyl (meth)acrylate monomers and monomers selected from cross-linked monomers, graft-linking monomers, and mixtures thereof, and wherein the shell comprises at least one layer comprising the reaction product of alkyl (meth)acrylate monomers and one or more chain transfer agents.

6. The filament of claim 4, wherein the core-shell acrylic additive comprises a methacrylate butadiene styrene core-shell polymer.

7. The filament of claim 6, wherein the shell of the methacrylate butadiene styrene core-shell polymer comprises methyl methacrylate.

8. The filament of claim 1, further comprising a filler selected from carbon fiber, wood fibers, metal powders, and graphite.

9. The filament of claim 1, wherein the thermoplastic resin comprises polyvinyl chloride (PVC).

10. The filament of claim 1, wherein the thermoplastic resin is selected from the group consisting of polyvinyl chloride and polylactic acid.

11. The filament of claim 1, wherein the acrylic polymer additive is present in an amount ranging from 0.5 to 10 phr.

12. The filament of claim 1, wherein the filament has an average diameter ranging from 1.0 to 5.0 mm.

13. The filament of claim 1, wherein the acrylic polymer additive comprises a terpolymer of methyl methacrylate, ethyl acrylate, and butyl methacrylate.

14. The filament of claim 13, wherein the acrylic polymer additive comprises at least 80 wt. % of units derived from the methyl methacrylate based on the total weight of the acrylic polymer additive.

15. The filament of claim 1, wherein the acrylic polymer additive comprises a terpolymer of methyl methacrylate, butyl acrylate, and butyl methacrylate.

16. The filament of claim 15, wherein the acrylic polymer additive comprises at least 80 wt. % of units derived from the methyl methacrylate based on the total weight of the acrylic polymer additive.

17. A 3D printed article prepared from the filament of claim 1.

18. A process of preparing filament for three-dimensional printing comprising:
combining a thermoplastic resin and an acrylic polymer additive to form a blend, wherein the acrylic polymer additive is present in an amount ranging from 0.1 to 20 parts per hundred of the thermoplastic resin (phr); and
extruding the blend in the form of a filament;
wherein the thermoplastic resin is selected from the group consisting of polylactic acid (PLA), polyvinyl chloride (PVC), acrylonitrile butadiene styrene (ABS), polymethyl methacrylate (PMMA), polycarbonate (PC), polyethylene terephthalate (PET), poly trimethylene terephthalate PTT, polybutylene terephthalate (PBT), polyamide (nylon), polyvinyl alcohol (PVA), polystyrene (PS), high impact polystyrene (HIPS), and blends thereof;
wherein the acrylic polymer additive comprises an acrylic copolymer that is the reaction product of methyl methacrylate monomers and at least one additional monomer selected from ethyl (meth)acrylate and butyl (meth)acrylate monomers; and wherein the acrylic polymer additive comprises at least 45 wt. % of units derived from the methyl methacrylate based on the total weight of the acrylic polymer additive.

* * * * *